United States Patent Office 2,886,565
Patented May 12, 1959

2,886,565

PHOTOGRAPHIC SENSITIZING DYES DERIVED FROM 2 - ALKYL - 5,6 - DIHYDRO - 4-H - PYRANO (3,2D) THIAZOLE

Irwin A. Prager, Naugatuck, and Robert H. Sprague, East Hampton, Conn., assignors to Sperry Rand Corporation, New York, N.Y., a corporation of Delaware No Drawing. Application September 12, 1955
Serial No. 533,921

13 Claims. (Cl. 260—240.4)

This invention relates to cyanine dyes containing a 5,6-dihydro-4-H-pyrano (3,2d) thiazole nucleus and to processes for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

We have now found that it is possible to prepare cyanine dyes in which one or both of the above mentioned auxochromic nitrogen atoms lie in a 5,6-dihydro-4-H-pyrano (3,2d) thiazole nucleus. We have further found that these new cyanine dyes sensitize photographic emulsions strongly and cleanly, i.e. without producing excessive fog or residual dye stain.

It is accordingly an object of our invention to provide new cyanine dyes. A further object is to provide photographic emulsions sensitized with such dyes. Other objects will appear hereinafter.

As starting material for the preparation of our new dyes, we employ 2-alkyl-5,6-dihydro-4-H-pyrano (3,2d) thiazoles, particularly 2-methyl-5,6-dihydro-4-H-pyrano (3,2d) thiazole. We first convert these alkyl-5,6-dihydro-4-H-pyrano (3,2d) thiazole bases to quaternary salts by reacting the base with esters, such as alkyl halides, alkyl sulfates, or alkyl-p-toluene sulfonates, for example. For purposes of convenience, the quaternary salts useful in practicing this invention can be represented by the following single formula:

(II)

$$\begin{array}{c} CH_2 \\ | \\ CH_2 \\ | \\ CH_2 \end{array} \begin{array}{c} S \\ \diagup \\ C \\ \| \\ C \end{array} C-R \quad X^- \\ \begin{array}{c} | \\ R \end{array}$$

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxy methyl, β-carbomethoxyethyl, β-carbethoxyethyl, allyl, etc., or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts, we react the quaternary salts with α-halogenoquinoline quaternary salts, in the presence of an acid binding agent, such for example, as sodium ethylate, sodium carbonate, pyridine or a strong organic base (e.g. triethyl amine, trimethylamine and N-methyl piperidine). We have found it advantageous to employ a mixture of pyridine with a strong tertiary organic base.

Instead of 2-halogenoquinoline quaternary salts, we can employ 2-alkylmercapto or 2-aryl mercapto quinoline quaternary salts to condense with the quaternary salts of 2-alkyl-5,6-dihydro-4-H-pyrano (3,2d) thiazole in the presence of an acid binding agent.

Using 2-halogenopyridine quaternary salts instead of 2-halogenoquinoline quaternary salts, we can prepare pyrido-cyanine dyes containing a 5,6-dihydro-4-H-pyrano (3,2d) thiazole nucleus.

Using 2-alkylmercapto or 2-arylmercaptobenzothiazole or naphthothiazole salts, we can prepare simple cyanine dyes other than pseudocyanine dyes.

To prepare symmetrical carbocyanine dyes from 2-alkyl-5,6-dihydro-4-H-pyrano (3,2d) thiazole quaternary salts, we react the quaternary salts with esters of orthoacids, e.g. ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 2-alkyl-5,6-dihydro-4-H-pyrano (3,2d) thiazole quaternary salts, we react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare styryl dyes from our new quaternary salts, we condense them with p-dialkyl aminobenzaldehyde in the presence of an alkaline catalyst, e.g. piperidine in absolute ethanol solution.

To prepare merocarbocyanine dyes from 2-alkyl-5,6-dihydro-4-H-pyrano (3,2d) thiazole quaternary salts, we condense the quaternary salts with ketomethylene heterocyclic intermediates containing an aryl amino-methylene group in the 5-position in the presence of an acid binding agent, e.g. pyridine plus triethyl amine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with our new dyes, we disperse the dyes in the emulsions. Our invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented December 14, 1943.

Our new base is prepared as follows:

(III) Cl—CH₂—CH₂—CH₂—CH₂—CN + HCl ⟶

Delta chlorovaleronitrile (IV) Cl—CH₂—CH₂—CH₂—CH₂—COOH

Delta chlorovaleric acid (IV) + Bromine ⟶ Cl—CH₂—CH₂—CH₂—ĊH—COOH (V)
                                       |
                                       Br Alpha bromo delta chlorovaleric acid (V) on distillation gives (VI)

$$Br-CH \begin{array}{c} CO \\ \diagup \quad \diagdown \\ \quad \quad O \\ | \\ CH_2 \quad CH_2 \\ \diagdown \quad \diagup \\ CH \end{array}$$

Alpha bromo delta valerolactone (VI) + CH₃CS—NH₂ ⟶ (II)
Thioacetamide $$\begin{array}{c} CH_2 \\ | \\ CH_2 \\ | \\ CH_2 \end{array} \begin{array}{c} S \\ \diagup \\ C \\ \| \\ C \end{array} C-CH_3$$

The following examples will serve to demonstrate the manner of preparation of our new bases, quaternary salts and dyes. These examples are not, however, intended to limit our invention.

Example 1.—Delta chlorovaleric acid (IV)

Five hundred grams of delta chloro valeronitrile (from BIOS Labs., 17 West 60th Street, New York, N. Y.) and 750 ml. of concentrated HCl were heated on the steam bath with stirring for 6 hours. The mixture was chilled, filtered, the filtrate was extracted with ether, dried, evaporated and the product distilled. The yield of material boiling at 112–125° at 8 mm. was 416 g., 72% of theoretical.

Example 2.—Alpha bromo delta valerolactone (VI)

The product from Example 1 (273 g.) and 10 ml. of $PBr_3$ were warmed on the steam bath and 320 g. of bromine was added dropwise with stirring over a period of 7 hours. The mixture was distilled slowly under reduced pressure, the acid vapors which were evolved being absorbed in an alkali trap. The yield of material boiling at 150–152° at 8 mm. was 352 g., 98% of theoretical.

Example 3.—2-methyl-5,6-dihydro-4-H-pyrano (3,2d) thiazole (II)

The product from Example 2 (35.8 g.) and 15.0 g. of thioacetamide were heated on the steam bath for 3 hours. Three runs of the above size were combined and the brown solid product was extracted with dilute HCl, the extract was shaken with ether and the water layer was made alkaline with $NH_4OH$. The oily precipitate was taken up in ether, dried with $K_2CO_3$, evaporated and distilled. The yield of material boiling at 85 to 95° at 0.5 mm. was 5.5 g., 6% of theoretical.

Example 4.—1′,3-diethyl-5′,6′-dihydro-4′-H-oxapyrano (3,2d) thiazolocarbocyanine iodide

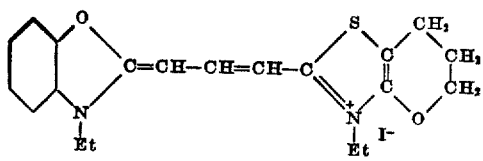

The product from Example 3 (0.7 g.) was heated on the steam bath with 1.2 g. of ethyl-p-toluene sulfonate for 4 hours. The viscous mass was dissolved in 15 ml. of absolute alcohol, 1.95 g. of 2-beta-acetanilidovinylbenzoxazole ethiodide and 0.5 g. of triethylamine were added and the mixture was refluxed for 5 minutes. The red solution was chilled, the dye was collected on a filter and recrystallized twice from 20 ml. of absolute ethanol. The yield of dark red needles of dye was .64 g. or 30% of theoretical. The dye melted at 232–234° C. with decomposition. A solution of the dye in methanol has an absorption maximum at 528 mu. Analysis of the dye gave the following result: Calc'd for $C_{20}H_{23}IN_2O_2S$ — Iodine, 26.32%; found—I, 26.58.

Example 5.—2-methyl-5,6-dihydro-4-H-pyrano (3,2d) thiazole ethoethylsulfate

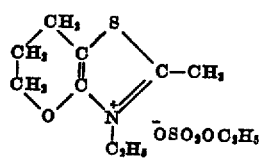

A mixture of 5.5 g. of 2-methyl-5,6-dihydro-4-H-pyrano (3,2d) thiazole and 6.0 g. of diethyl sulfate was heated at 115° for 12 hours. The brown mixture was cooled, washed by decantation with several 50 cc. portions of absolute ether and dried in a vacuum desiccator. The yield of viscous non-crystaline product was 10.5 g., 96% of theoretical.

Example 6.—2-para dimethylaminostyryl-5,6-dihydro-4-H-pyrano (3,2d) thiazole ethiodide

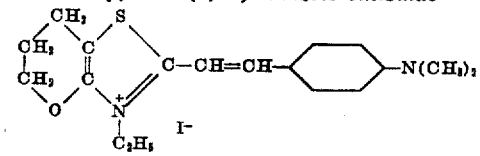

A mixture of 3.1 g. of 2-methyl-5,6-dihydro-4-H-pyrano (3,2d) thiazole ethoethylsulfate, 1.5 g. of p-di-methyl amino benzaldehyde, 15 ml. of absolute ethanol, 2 drops of piperidine and 1.5 g. of sodium iodide was refluxed for 90 minutes. The mixture was chilled, the dye was collected on a filter and washed with acetone and water. After recrystallization from methanol the dye was obtained in the form of cubic red crystals with a bright green reflex. The dye melted above 315° C. The yield of purified dye was 2.05 g., 47% of theoretical. A solution of the dye in methanol has an absorption maximum at 494 mu.

Example 7.—3-ethyl-5-[(1-ethyl-5,6-dihydro-4-H-pyrano (3,2d) thiazolyl (1,2)-idene) ethylidene] rhodanine

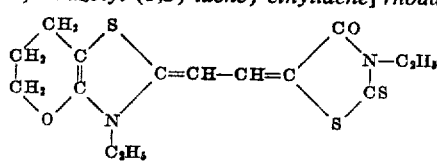

A mixture of 3.1 g. of 2-methyl-5,6-dihydro-4-H pyrano (3,2d) thiazole etho ethylsulfate, 2.94 g. of 5-acetanilido methylene-3-ethyl rhodanine, 1.0 g. of triethyl amine and 15 ml. of absolute ethanol was refluxed for 15 minutes. The dye was collected on a filter and recrystallized from methanol. The yield of steel blue needles of dye melting at 216–218° with decomposition was 3.0 g., 94% of theoretical. A methanol solution of the dye has an absorption maximum at 556 mu.

Example 8.—5-chloro-1′,3-diethyl-5′,6′-dihydro-4′-H-oxapyrano (3,2d) thiazolocarbocyanine iodide

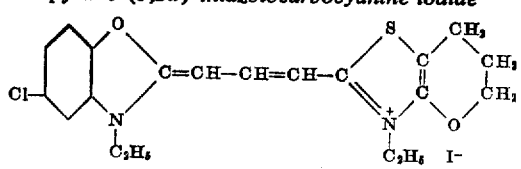

A mixture of 3.1 g. of 2-methyl-5,6-dihydro-4-H-pyrano (3,2d) thiazole ethoethylsulfate, 4.7 g. of 2-β-acetanilido vinyl-5-chlorobenzoxazole ethiodide, 1.0 g. of triethyl amine and 20 ml. of absolute ethanol was refluxed for 5 minutes. The mixture was chilled, the dye was filtered off, washed with acetone and water and recrystallized from methanol. The dye was obtained in the form of magenta needles which melted with decomposition at 249–250° C. The yield of purified dye was 0.94 g., 20% of theoretical. A methanol solution of the dye has an absorption maximum at 524 mu.

Example 9.—2-methyl-5,6-dihydro-4-H-pyrano (3,2d) thiazole metho-para toluene sulfonate

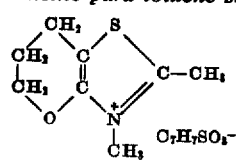

A mixture of 2.5 g. of 2-methyl-5,6-dihydro-4-H-pyrano (3,2d) thiazole and 3.5 g. of methyl-p-toluene sulfonate was heated at 115° C. for 1 hour. The product was cooled, stirred with 20 ml. of acetone until crystalline, filtered and dried in vacuum desiccator over calcium chloride. The yield of hygroscopic white crystals was 1.2 g.

Example 10.—*1'-ethyl-1-methyl-5,6-dihydro-4-H-pyrano (3,2d) thiazolo 2'-cyanine iodide*

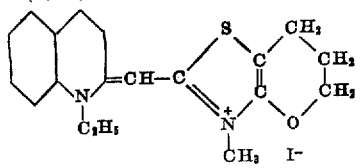

A mixture of 0.84 g. of 2-iodoquinoline ethiodide, 0.7 g. of 2-methyl-5,6-dihydro-4-H-pyrano (3,2d) thiazole metho-p-toluene sulfonate, 0.5 g. triethylamine and 15 ml. of absolute ethanol were refluxed for 30 minutes. The mixture was chilled, the dye was collected on a filter and washed with acetone and water. After recrystallization from methanol the dye was obtained in the form of red needles which melted with decomposition at 256–257° C. The yield of pure dye was 0.5 g., 55% of theoretical. A methanol solution of the dye has an absorption maximum at 500 mu.

Example 11.—*1,1'-diethyl bis (5,6-dihydro-4-H-pyrano (3,2d) thiazolocarbocyanine iodide*

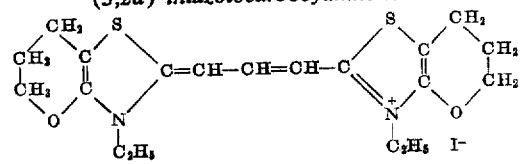

A mixture of 4.0 g. of 2-methyl-5,6-dihydro-4-H-pyrano (3,2d) thiazole ethiodide, 5 ml. of diethoxymethylacetate and 15 ml. of pyridine was refluxed for 10 minutes. The dye was precipitated with ether and recrystallized from absolute ethanol. The yield of blue black crystals of dye was 0.1 g. The dye melted with decomposition at 170–173° C. A methanol solution of the dye has a maximum absorption at 580 mu.

It is well known that cyanine dyes resonate between two extreme forms and that a cyanine dye can be represented by either of the two extreme forms. Thus, the unsymmetrical type of instant dyes can be represented by either of the following formulas.

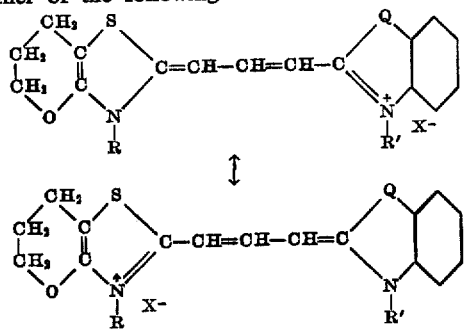

The features of novelty which we believe to be characteristic of our invention are set forth with particularity in the following claims. It should be understood, however, that modifications and changes may be made, without departing from the spirit and substance of our invention, as will be apparent to those skilled in the art.

We claim:

1. A dye selected from the group characterized by the following general formula:

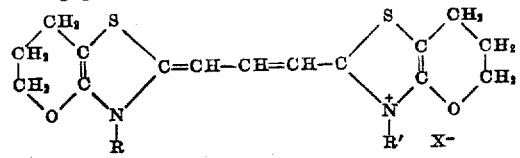

where R and R' respectively represent members selected from the group consisting of alkyl and aralkyl groups and X⁻ represents an anion.

2. 1,1'-diethyl bis (5,6-dihydro-4-H-pyrano (3,2d) thiazolocarbocyanine iodide.

3. A dye selected from the group characterized by the following general formula:

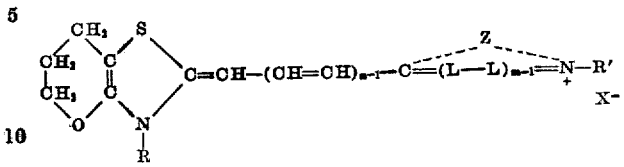

where R and R' respectively represent members selected from the group consisting of alkyl and aralkyl groups, m represents a positive integer from one to two, L represents a methine group, n represents a positive integer from one to three, X represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

4. 1',3 - diethyl - 5',6' - dihydro - 4' - H - oxapyrano (3,2d) thiazolocarbocyanine iodide having the following structure:

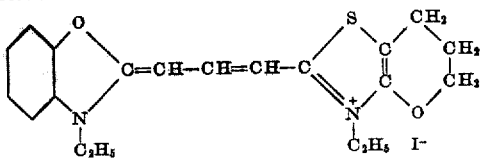

5. 1' - ethyl - 1 - methyl - 5,6 - dihydro - 4' - H - pyrano (3,2d) thiazolo-2'-cyanine iodide having the following structure:

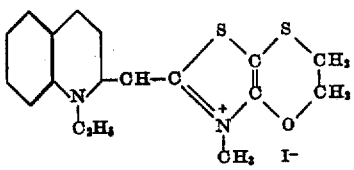

6. A dye selected from the group characterized by the following general formula:

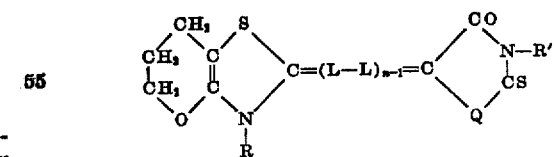

where R represents a member selected from the group consisting of alkyl and aralkyl groups, R' represents a member selected from the group consisting of alkyl, aralkyl and aryl groups, L is a methine group, n is a positive integer of from one to four, and Q is a member selected from the group consisting of oxygen, sulfur, selenium and =N—R'.

7. 3 - ethyl - 5 - [(1 - ethyl - 5,6 - dihydro - 4 - H - pyrano (3,2d) thiazolyl (1,2) idene) ethylidene] rhodanine having the following structure:

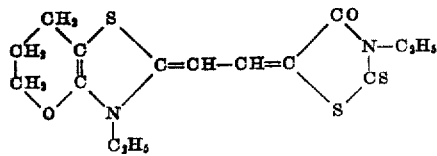

8. A dye selected from the group characterized by the following general formula:

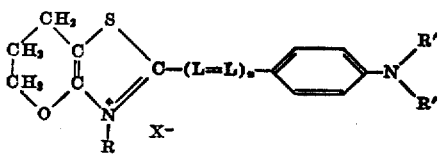

where R and R' respectively represent members selected from the group consisting of alkyl and aralkyl groups, L represents a methine group, n is a positive integer from one to two and X⁻ represents an anion.

9. 2 - paradimethylaminostyryl - 5,6 - dihydro - 4 - H - pyrano (3,2d) thiazole ethiodide having the following structure:

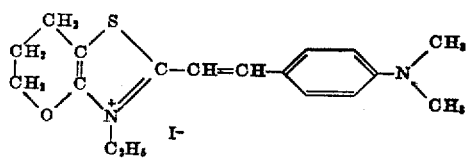

10. A process for preparing symmetrical carbocyanine dyes having the general formula:

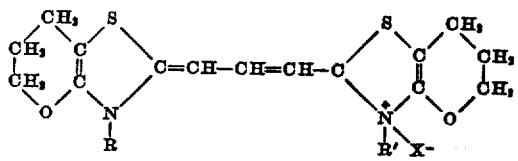

where R and R' respectively represent members selected from the group consisting of alkyl and aralkyl groups and X⁻ represents an acid radical from a quaternary salt having the general formula

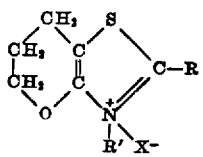

where R represents an alkyl radical $C_nH_{2n+1}$, n is a positive integer of from one to three and R' represents a member selected from the group consisting of alkyl and aralkyl groups and X⁻ represents an anion comprising condensing the quaternary salts with an ester of an orthocarboxylic acid in an alkaline medium containing at least one constituent selected from the group consisting of pyridine and a mixture of pyridine and triethylamine.

11. A process for preparing unsymmetrical cyanine dyes having the general formula

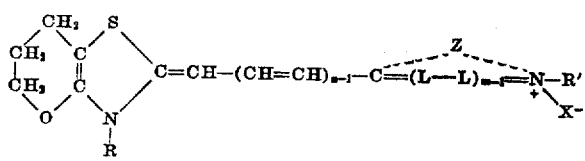

where R and R' respectively represent members selected from the group consisting of alkyl and aralkyl groups, m represents a positive integer of from 1 to 2, n represents a positive integer of from 1 to 3, L represents a methine group, X⁻ represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from a quaternary salt having the general formula

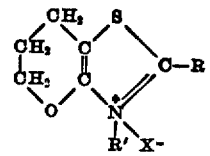

where R represents an alkyl radical $C_nH_{2n+1}$, n is a positive integer of from one to three, R' represents a member selected from the group consisting of alkyl and aralkyl groups and X⁻ represents an anion comprising condensing the quaternary salt with a heterocyclic ammonium quaternary salt having a reactive constituent selected from the group consisting of aryl aminovinyl and aminobutadienyl groups, halogen atoms and thioether groups in a position selected from the alpha and gamma positions with respect to the nitrogen atom in the heterocyclic ring of said heterocyclic ammonium quaternary salt in the presence of an alkaline condensing agent.

12. A process for preparing merocarbocyanine dyes containing the 5,6-dihydro-4-H-pyrano (3,2d) thiazole nucleus and having the general formula

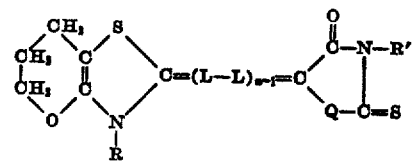

where R represents a member selected from the group consisting of alkyl and aralkyl groups, R' represents a member selected from the group consisting of alkyl, aralkyl and aryl groups, L is a methine group, n is a positive integer of from one to four and Q is a member selected from the group consisting of oxygen, sulfur, selenium, and =N—R' comprising condensing a quaternary salt having the general formula

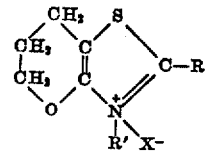

where R represents an alkyl radical $C_nH_{2n+1}$, n is a positive integer of from one to three, R' represents a member selected from the group consisting of alkyl and aralkyl groups and X⁻ represents an anion with ketomethylene heterocyclic compounds having the ketomethylene heterocyclic ring of said merocarbocyanine dyes and having a reactive arylaminomethylene group in the 5 position with respect to the member represented by Q in the general formula for said merocarbocyanine dye, in an alkaline medium.

13. A process for preparing styryl dyes containing the 5,6-dihydro-4-H-pyrano (3,2d) thiazole nucleus having the general formula

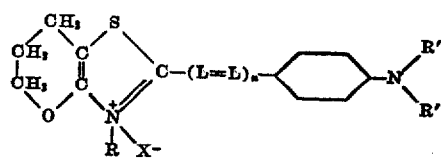

where R and R' respectively represent members selected from the group consisting of alkyl and aralkyl groups, L represents a methine group, n is a positive integer from one to two and X⁻ represents an anion comprising condensing a quaternary salt having the general formula

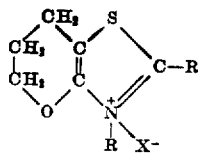

where R represents an alkyl radical $C_nH_{2n+1}$, $n$ is a positive integer of from one to three and R' represents a member selected from the group consisting of alkyl and aralkyl groups, and $X^-$ represents an anion with p-dialkyl aminobenzaldehyde in the presence of an alkaline catalyst.

References Cited in the file of this patent

UNITED STATES PATENTS

| | | |
|---|---|---|
| 1,970,656 | Johnson | Aug. 21, 1934 |
| 2,078,233 | Brooker | Apr. 27, 1937 |
| 2,133,969 | Buchman | Oct. 25, 1938 |
| 2,155,475 | Dieterle | Apr. 25, 1939 |
| 2,263,749 | White et al. | Nov. 25, 1941 |
| 2,322,015 | Hamer et al. | June 15, 1943 |
| 2,336,463 | Brooker et al. | Dec. 14, 1943 |
| 2,336,843 | Brooker et al. | Dec. 14, 1943 |
| 2,353,164 | Kendall et al. | July 11, 1944 |
| 2,494,032 | Brooker et al. | Jan. 10, 1950 |
| 2,692,829 | Aubert et al. | Oct. 26, 1954 |

OTHER REFERENCES

Chemical Abstracts 16, 3101 (abstract of Brit. Med. Journal, 1922, I, 514–5). Copy in Sci. Library.)

Chemical Abstracts 19, 530 (abstract of Proc. Roy. Soc., London, 96B, 317–33, 1924.) (Copy in Sci. Library.)

Clerc: "Photography Theory and Practice," 3rd ed., page 151, Pitman Pub. Corp., N.Y., 1942. (Copy in Div. 50.)